United States Patent Office.

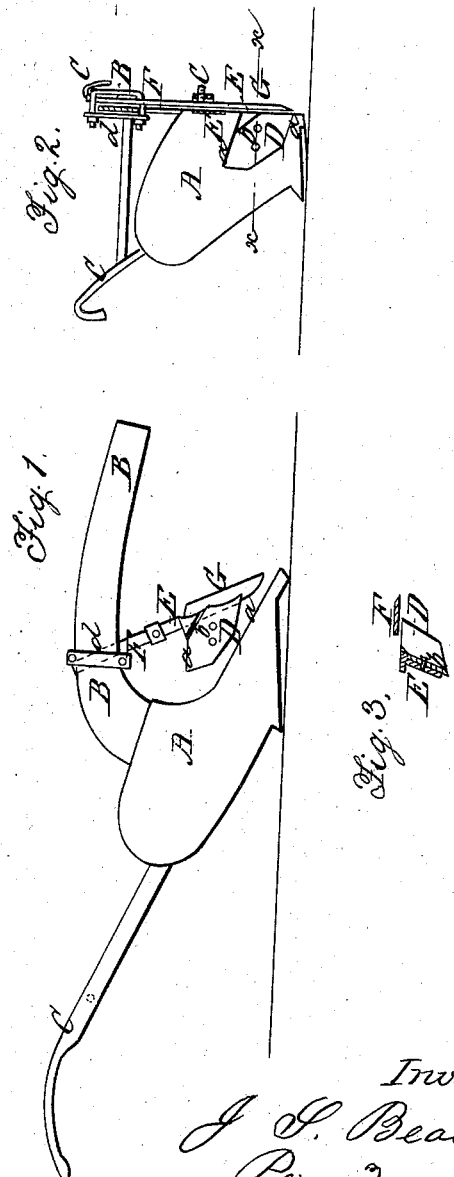

J. S. BEALS, OF ALABAMA CENTRE, NEW YORK.

Letters Patent No. 68,152, dated August 27, 1867.

PLOUGH.

*The Schedule referred to in these Letters Patent and making part of the same.*

TO ALL WHOM IT MAY CONCERN:

Be it known that I, J. S. BEALS, of Alabama Centre, in the county of Genesee, and State of New York, have invented a new and improved Plough; and I do hereby declare that the following is a full, clear, and exact description thereof, which will enable those skilled in the art to make and use the same, reference being had to the accompanying drawings, forming part of this specification, in which—

Figure 1 represents a side elevation of my improved plough.

Figure 2 is a front elevation of the same.

Figure 3 is a detail horizontal section of the same, taken in the line $x\ x$, fig. 2.

Similar letters of reference indicate corresponding parts.

This invention relates to certain improvements on the plough for which Letters Patent were granted to me on the tenth day of April, 1866.

The improvement consists in the construction of the supplemental share, and in the manner of securing the same to the standard, and in securing the coulter to the lower end of the same standard on which the said supplementary share is arranged.

A is the share and mould-board, B the beam, and C the handle of an ordinary plough. D is the supplementary share, which is constructed of steel plate, or other suitable material, which is bent so as to present a concave front, and which is provided with double cutting edges $a\ a$, one at the lower end and one at the upper end. This share is secured by means of one or more rivets, $b$, to the horizontal arm of an L-shaped bar, E. The upper end of the vertical arm of E is arranged in form of a sleeve, which surrounds the standard F, to which it is secured by a set-screw, $c$, as is clearly shown in fig. 2. The standard F is secured to the right-hand side of the plough-beam by a clip, $d$, as shown. It will thus be seen that the share D can be adjusted up and down on the standard F, and be held in any desired position by the set-screw $c$. The share D itself can, when its lower cutting edges are worn off, be turned on the bar E by taking out the bolt or rivet $b$, so that the cutting edges on the upper end of the share D can be used. One such share can thus be used for as long a time as otherwise two shares would be used. To the lower end of the standard F is firmly arranged the coulter G, which is thus close to the left-hand side of the share D, so that the said coulter forms a land-side for the share D, and effectually prevents the escape towards that side of the share of any of the soil which is taken up by the share D. The construction of the whole plough is also simplified by doing away with the separate standard for the coulter.

I claim as new, and desire to secure by Letters Patent—

1. Making the opposite ends of the share D equal to each other, so as to provide the same with double cutting edges $a\ a$, substantially as and for the purpose herein shown and described.

2. Securing the share D to the lower portion of a bar, E, which is adjustable on the standard F by means of set-screw $c$, substantially as and for the purpose herein shown and described.

3. Securing the coulter G on the lower end of the same standard on which the supplementary share D is arranged, substantially as and for the purpose herein shown and described.

J. S. BEALS.

Witnesses:
    J. W. HOLMES,
    JOSEPH HOLMES.